Patented Oct. 10, 1950

2,524,970

UNITED STATES PATENT OFFICE 2,524,970

PHOTOCHEMICAL PREPARATION OF BENZENE HEXACHLORIDES

Max Gonze, Forest-Brussels, Belgium, assignor to Solvay & Cie, Brussels, Belgium, a Belgian company No Drawing. Application January 3, 1948, Serial No. 471. In Belgium January 17, 1947

3 Claims. (Cl. 204—163)

This invention relates to the preparation of a mixture of benzene hexachlorides that is free from substitution products and has improved insecticide properties. It has more particularly for its object to perform the chlorination of benzene under conditions permitting the obtaining of highly concentrated solutions of benzene hexachlorides.

It has been usually admitted heretofore that the presence in benzene solutions of high benzene hexachloride concentrations would favour secondary reactions of substitution. For this reason, in known processes substitution was partly avoided by interrupting chlorination when the benzenic solution reached a benzene hexachloride concentration of 15 to 20%.

I now have discovered that these reactions of substitution can be totally avoided if chlorination is effected at a temperature lower than the temperature of crystallization of pure benzene ($+6°$ C.). I have found that on account of the lowering of the point of solidification of benzene due to the dissolution of benzene hexachlorides therein, it is possible to operate at temperatures sufficiently low to eliminate the secondary reactions of substitution due to the presence of benzene hexachlorides, whatever be the concentration in isomers of the benzenic solutions produced in the different stages of manufacture.

The process according to this invention thus consists in preparing benzene hexachlorides free from substitution products by performing the additive chlorination of benzene, in the presence of light, at a temperature comprised between the crystallization temperature of benzene and the temperature at which benzene crystals form in the benzenic solution of benzene hexachlorides. Advantageously the operation is started at the crystallization temperature of benzene and the temperature is lowered as the benzene hexachloride concentration in the benzenic solution increases.

The preparation of products according to this invention is illustrated by the following examples:

Example 1

In a receptacle containing no selective catalyst for substitution reactions, I introduce 5 moles of benzene. I cool at $+6°$ C. and I obtain an atmosphere free from oxygen by blowing in $CO_2$. The reactor is lighted by a lamp of the Philora type (mercury vapor) and chlorine is introduced at the rate of 1 mole per hour. As the $C_6H_6Cl_6$ concentration of the benzenic solution increases, the operating temperature is gradually lowered so as to complete the chlorination at a temperature of $+1°$ C.

The coloration due to dissolved chlorine immediately disappears. No evolution of HCl is observed and the final solution containing 14% benzene hexachlorides is strictly neutral. After filtering and carrying off the benzene with water vapor, I separate a mixture of isomers with no disagreeable odor and having remarkable insecticide properties.

The process according to this invention is of particular advantage when it is carried out in a manner similar to that described in the co-pending patent application Ser. No. 692,722, filed August 23, 1946.

Example 2

The solution obtained in the manner described in Example 1 is subjected to different successive chlorinations, interrupted by filtration of the crystals formed.

To each chlorination corresponds an increase in the content in isomers of the benzenic solution, the operating temperature being correspondingly lowered each time, taking into account the point of solidification of benzene at these different concentrations. After a final concentration at $-8°$ C. I obtain a solution, saturated in isomer $\gamma$ at that temperature, whose content in benzene hexachlorides is of the order of 400 gr. per kg.

The solid product obtained after carrying off the benzene by water vapor is strictly neutral, has no disagreeable odor and possesses exceptional insecticide properties.

Example 3

In a benzenic solution saturated with each of $\alpha$, $\beta$ and $\gamma$ benzene hexachlorides at $8°$ C. and brought to $-4°$ C., I inject purified benzene and chlorine, in stoichiometric amounts, so as to keep the solution saturated with $\gamma$ isomer at a temperature of $-8°$ C. In order to eliminate the oxygen from the reaction space the chlorine is diluted with 10% nitrogen. I take off in a continuous manner a portion of the solution at $-4°$ C. which is cooled down to $-8°$ C. in a crystallizer. The crystals formed are filtered in a suitable apparatus and a portion of the filtrate is reintroduced into the chlorinator, while another portion is withdrawn from the cycle as a finished product.

The benzenic solution containing 400 gr. of $C_6H_6Cl_6$ per kg. comprises no substitution product and can therefore be indefinitely reintroduced into the cycle.

The solid products obtained after carrying off the benzene with water vapor have the same properties as those obtained in accordance with Example 2.

I claim:

1. A continuous process of preparing benzene hexachloride by chlorination of benzene, which consists in introducing chlorine gas into benzene in a chlorination chamber at substantially atmospheric pressure in the presence of light, thereby producing a benzenic solution of benzene hexachlorides, withdrawing said solution from said chamber, cooling said solution in a crystallizer at a temperature between the temperature at which benzene crystals form and the crystallization temperature of benzene in the benzenic solution of benzene hexachlorides, thereby causing the formation and the separation of crystals of benzene hexachloride isomers, withdrawing part of the mother liquor as finished product, leading the remaining part of said mother liquor back to said chlorinator chamber and introducing into said chlorinator stoichiometric quantities of benzene and chlorine gas suitable for maintaining the solution in said chamber saturated with $\alpha$, $\beta$ and $\gamma$ isomers at the temperature of the said crystallizer, and maintaining the temperature in said chlorinator chamber between the crystallization temperature of pure benzene and the temperature in said crystallizer.

2. A process of preparing benzene hexachloride which comprises introducing chlorine gas into benzene at atmospheric pressure in the presence of light to form benzene hexachloride in benzenic solution by the additive chlorination of said benzene, said chlorination being carried out at a temperature between the crystallization temperature of pure benzene and the temperature at which benzene crystals form in said benzenic solution of benzene hexachlorides.

3. A process of preparing benzene hexachlorides which comprises blowing chlorine gas into benzene at substantially atmospheric pressure in the presence of light to form benzene hexachlorides in benzenic solution by the additive chlorination of said benzene, said chlorination being started at substantially the crystallization temperature of benzene and the operating temperature being gradually lowered as the benzene hexachloride concentration of the solution increases, while keeping said temperature above the temperature at which benzene crystals form in said benzenic solution of benzene hexachlorides.

MAX GONZE.

REFERENCES CITED

The following references are of record in the file of this patent:

UNITED STATES PATENTS

| Number | Name | Date |
| --- | --- | --- |
| 2,010,841 | Bender | Aug. 13, 1935 |
| 2,218,148 | Hardie | Oct. 15, 1940 |
| 2,438,900 | Cooke et al. | Apr. 6, 1948 |

FOREIGN PATENTS

| Number | Country | Date |
| --- | --- | --- |
| 469,299 | Belgium | May 1, 1947 |
| 504,569 | Great Britain | Oct. 26, 1938 |

OTHER REFERENCES

Slade, Chemistry and Industry, Oct. 13, 1945, pp. 314–19.